April 16, 1968 C. C. SONS, JR 3,378,095
MULTI-WHEELED OSCILLATING CARRIAGE
Filed Feb. 6, 1967 2 Sheets-Sheet 1

INVENTOR.
CHARLES C. SONS, JR.
BY
*Fryer, Zimmerld, Feist Phillips*
ATTORNEYS

United States Patent Office 3,378,095
Patented Apr. 16, 1968

3,378,095
MULTI-WHEELED OSCILLATING CARRIAGE
Charles C. Sons, Jr., Peoria, Ill., assignor to Caterpillar Tractor Co., Peoria, Ill., a corporation of California
Filed Feb. 6, 1967, Ser. No. 614,087
3 Claims. (Cl. 180—75)

ABSTRACT OF THE DISCLOSURE

Smaller multi-wheeled units can be used to replace the larger single wheels, often used in earthmoving equipment, provided the load is somehow evenly distributed between the smaller wheels. Multi-wheeled oscillating carriages can be used to achieve load distribution between the wheels if the load capacity of the carriage is adequate and a satisfactory means can be provided to effectively power the plurality of wheels while oscillation is occurring. By using a trunnion-mounted gear case having a perpendicular rigid axle with wheels journaled on its opposite ends and a coaxial drive shaft through the trunnion mounting, it is possible to achieve a multi-wheeled carriage with the desirable characteristics and load-carrying capacity.

Background of the invention

Oscillating multi-wheeled carriages are known and are often found in bogie constructions, such as those shown in U.S. Patent No. 2,121,862 issued to Dodge. Such oscillating constructions are often dual-wheeled and are capable of evenly distributing the weight or load between the closely adjacent wheels when the carriage is traversing uneven terrain. For this reason, these assemblies can be used to replace larger single wheels which are often found in earthmoving equiment without sacrificing capacity or mobility as occurs when two wheels are rigidly fastened together in a conventional dual structure by connecting them at their rims without oscillation.

While in earthmoving equipment multi-wheeled oscillating carriages can be used to replace the larger, expensive wheel structures, these carriages must have high load capacity and include some means for powering the plurality of wheels mounted on the carriage. Since designs for oscillation require elimination of the conventional rigid axle spanning beneath the vehicle through which torque is usually supplied, other means must be provided to drive the multi-wheels of an oscillating carriage. Unless the wheels of the carriage are powered by a unit completely within the carriage, such as an electric motor, which oscillates with it, supplying drive means to such a carriage presents a problem. This problem can be more fully appreciated by referring to U.S. Patent No. 3,029,889 issued to Paramythioti, which discloses a sprocket universally mounted on a cross drive shaft so that as the shaft oscillates the sprocket can maintain alignment with its driving sprocket. Such an assembly is both bulky, cumbersome and also is difficult to maintain.

Summary

In general, an improved multi-wheeled oscillating carriage can be provided by constructing it with a hollow gear case having axially aligned trunnion mounts on opposite ends for supporting it on a vehicle, providing the case with two wheel support means on opposite sides which project therefrom to form a rigid axle which has its axis transverse to the axis of the trunnion mounts, journalling wheels at the opposite ends of the rigid axle, and providing a drive shaft means coaxially through one of the trunnion mounts to drive the wheels.

The above briefly-described carriage provides many advantages over the prior art assemblies. Some of these advantages include a convenient coaxial drive which is unaffected by oscillation, strong trunnion support mounting, provision for reduction gearing and, if desired, the inclusion of braking assemblies while maintaining the carriage small, compact and simple. Further, these oscillating assemblies are so constructed so that they can be individually serviced with reference to wheels on opposite sides, quickly interchanged and also connected in tandem if desired. Due to the structure's simplicity it is economical to produce, which is an added advantage.

Description of an embodiment

Figure 1:
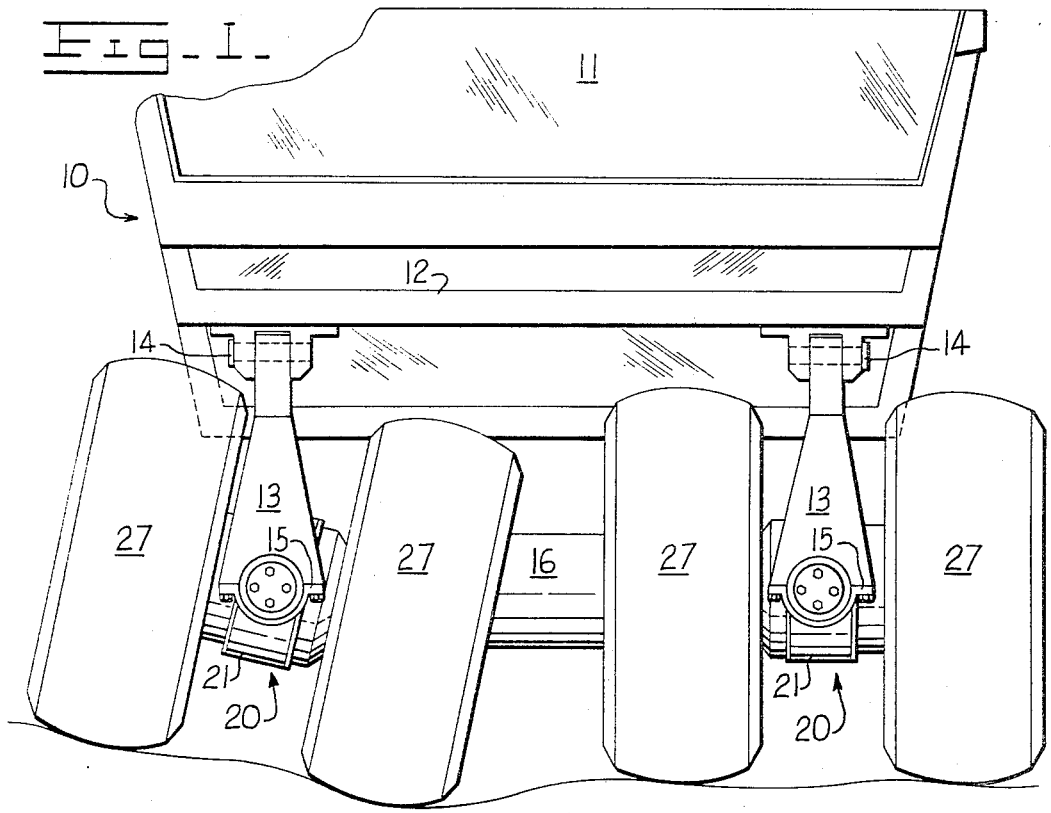
FIG. 1 is an elevation of the rear of an off-highway truck incorporating the oscillating carriages of this invention.

Referring to FIG. 1 showing the rear end of an off-highway truck 10, a truck box 11 is reinforced by a transverse frame member 12 to which support structures 13 are attached with pins 14. The upper portion of each support is reduced in size so that as the carriage 20 oscillates it will not contact the upper portions of the structure. The carriage is journaled at its fore and aft ends at the lower end of the support structure and retained therein with caps 15.

Figure 2:
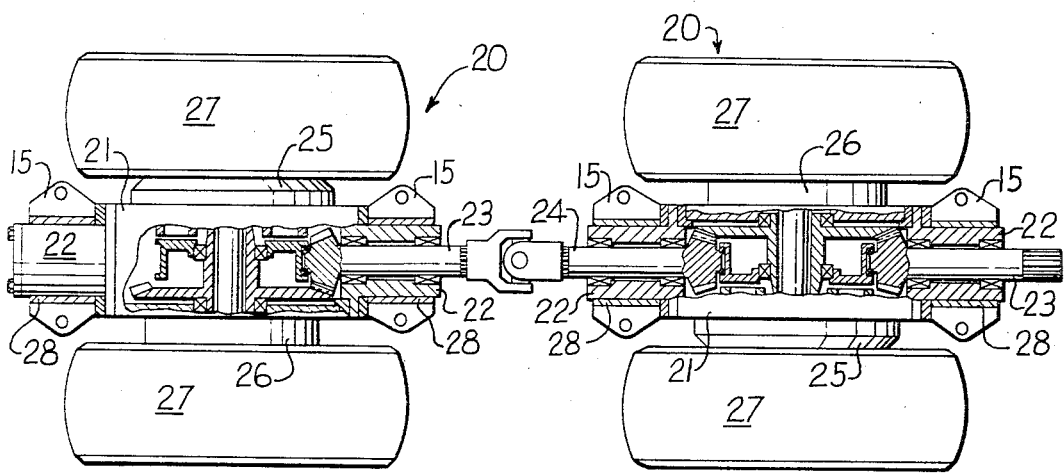
FIG. 2 is a plan view with parts broken away to show detail of a pair of the novel oscillating carriages connected in tandem.

Each dual-wheeled oscillating carriage 20 is similarly constructed except that some may have an additional shaft means to transmit power through the carriage to a carriage connected with it in tandem, as can be seen in FIG. 2. Bascially, each carriage includes a gear case or housing 21 having trunnion mounts 22 at opposite ends which are axially aligned. Through the trunnion axis of one mount a drive shaft 23 extends coaxially therethrough and the opposite trunnion may likewise have a take-off drive shaft 24 to drive a tandemly connected carriage. (See FIG. 2.) A rigid axle structure 32 is supplied by two cone-shaped wheel support flanges 25 and 26 which are secured to the case with bolts 30 to form a rigid axle having an axis perpendicular to the axis of the trunnion mounts. Hubs and rims are supported directly on the rigid axle for retaining tires 27.

As can be seen in FIGS. 1 and 2 the trunnion mounts 22 of each oscillating carriage are supported on bearings 28 within the support structure 13 and by cap 15 so that the carriage actually oscillates about its trunnion axis when traversing uneven terrain to distribute the load between the wheels on opposite sides of the carriage. Since the drive shafts are coaxial with the trunnion mounts, oscillation of the carriage does not cause any misalignment problems.

Figure 3:
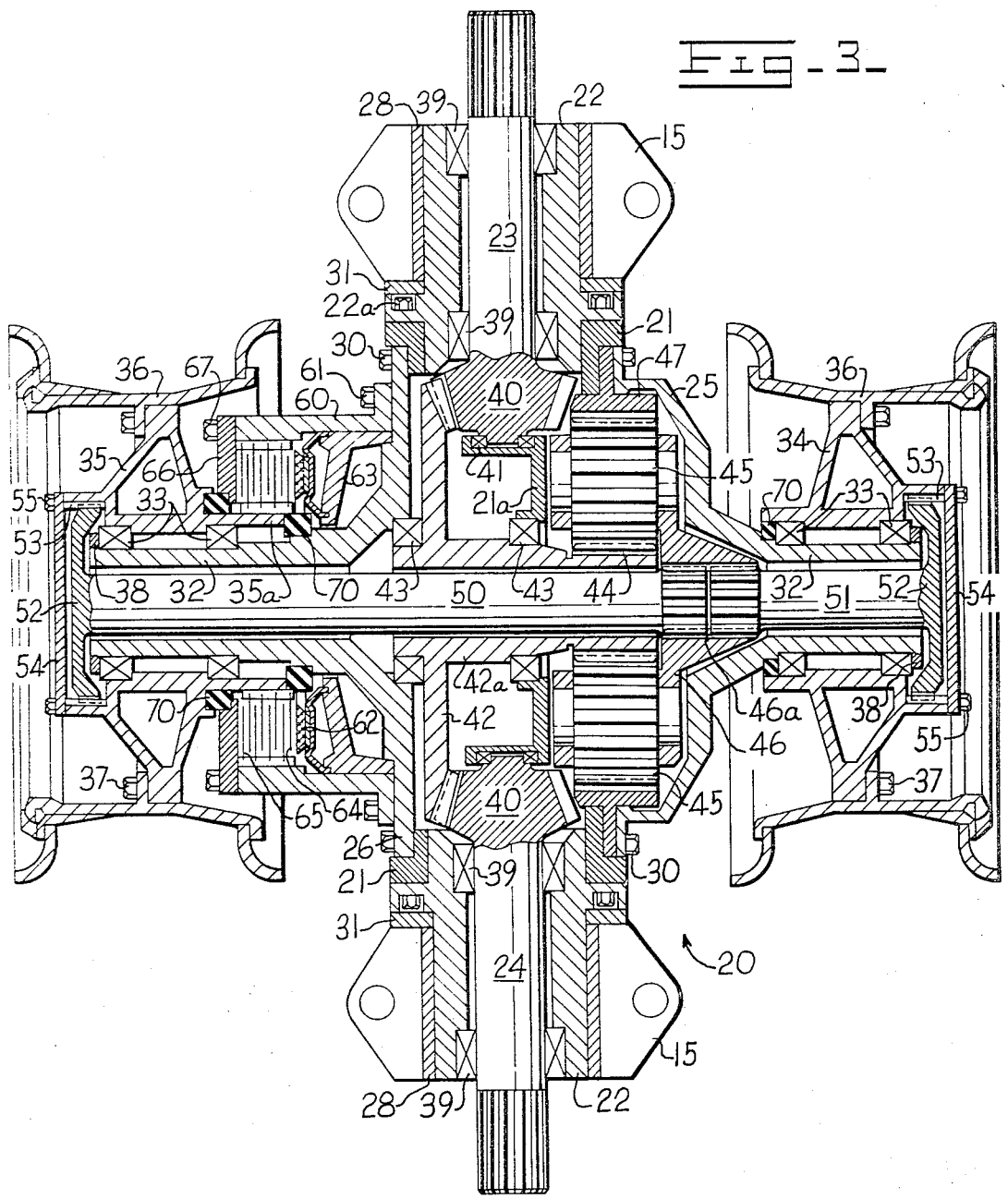
FIG. 3 is a detailed section through one of the multi-wheeled oscillating carriages.

In FIG. 3, some important structural details of the carriage are evident. Generally the gear case 21 is a hollow cylindrical structure with an internal support web 21a to provide support for bearings and is closed on opposite sides by the cone-shaped wheel support flanges 25 and 26, respectively, secured thereto. The trunnion mounts 22 are located at opposite ends of the gear case and are axially aligned. The rigid axle formed by the wheel support flanges, i.e. their projecting ends, moves up and down in response to the terrain profile causing the carriage unit to oscillate within its trunnion supports. The trunnion mounts 22 are attached to the gear case or housing 21 by a plurality of bolts 22a to become an integral part thereof and are equipped with thrust washers 31 to insure free oscillation under heavy loads.

Wheel support flanges 25 and 26 are constructed differently since flange 25 provides part of the case for the reduction gearing and flange 26 provides support structure for a brake assembly. However, both flanges provide a journal at their outboard ends which, through bearings 33, support the hubs 34 and 35 for the wheels on opposite sides of the carriage. This particular construction allows the wheel loading to be carried by the strong flange structure, case and the trunnion mounts rather than being carried by the outboard end of an axle shaft. High load carrying capacity in the wheeled carriage structure is thus achieved which makes this unit useful for heavy duty operation in earth-moving vehicles.

Hub 34 mounted on wheel support flange 25 is similar to hub 35 mounted on flange 26, except the latter has a splined extension 35a which projects into a brake assembly shown in FIG. 3. Both hubs have tire rims 36 attached with bolts 37 and are secured on their respective flanges through bearings 33 with a retaining nut 38 screwed onto the threaded outboard end of each flange and then keyed or locked to prevent it from working free. Bearings 33 are preferably tapered roller bearings in this type of structure.

Power is supplied to each hub through a compact gear reducing train and floating shaft structure. Either drive shaft 23 or take-off shaft 24 supported on bearings 39 through its beveled pinion gear 40, which is stabilized by bearing 41 in the web 21a, can drive bevel gear 42 which is supported in the gear case on bearings 43. The bevel gear rotates about an axis perpendicular to the drive shafts and has a hollow hub 42a through which it is supported in the bearings; and on a projecting end of the hub is a sun gear 44. This sun gear cooperates with a plurality of planet gears 45 which are positioned about it on a planet carrier 46 having a hollow hub 46a which is splined. Surrounding the planet gears is a ring gear 47 which is secured to the gear case 21 with bolts 30 when flange 25 is assembled thereon. Rotation of the sun gear causes the planet gears to track around the ring gear causing the planet carrier to rotate.

Torque from the planet carrier is delivered to the hubs via floating shafts 50 and 51 which have sprockets 52 at their outboard ends whose teeth are received in female splined recesses 53 on the outboard side of each hub. Each sprocket is localized in its recess by a cover 54 secured to the hub with bolts 55. Since the hub 42a of the bevel gear and the hub 46a of the planet carrier are hollow, the inboard ends of the floating shafts 50 and 51 can pass axially therethrough. However, the inboard ends of the floating shafts have splines which mate with those in the hub of the planet carrier locking them against rotation.

Using the above construction, the hubs are "locked" with the planet carrier in a manner that torsional deflections are not induced on the planetary structure by the wheel assemblies. Further, using the above construction individual maintenance and service of wheels on opposite sides of the carriage can be easily accomplished. Simplified removal of either hub insures fast servicing and shafts 50 and 51 can be removed in order to allow the wheels on the carriage to become freewheeling. Either wheel assembly can be removed by detaching cover 55, pulling shaft 50 or 51 and removing locking nut 38 which allows the whole wheel assembly to be removed.

Braking the multi-wheels of the carriage 20 is accomplished through braking one hub, hub 35, but is effective for braking both wheels since the floating shafts 50 and 51 "lock" the two hubs together so that braking of one is effective on the other. However, even if the carriage is converted to a freewheeling one by removing the floating shafts, braking is effective on one hub. For the braking assembly a cylindrical shell 60 forms the brake housing and mounts coaxially on the wheel support flange 26 with bolts 61. The inboard portion of the shell contains the brake actuator 62 and its supporting structure 63. A plurality of discs 64 and 65 are alternately stacked in the outboard end of the shell and retained therein by pressure plate 66 secured by bolts 67. Discs 64 are keyed to a portion of the hub 35a, while discs 65 are keyed to the shell. Thus, when actuator 62 compresses the discs against one another and the pressure plate 66, the discs will effect a braking action between the hub and the portions of the brake assembly fixedly mounted on flange 26. This braking assembly operates in a conventional manner.

Usually the multi-wheeled oscillating carriages of the type described above include elastomer seals 70 between relatively rotating parts throughout the carriage in order to seal out abrasive materials which would damage the internal bearing structures when working in dirty or gritty environments.

The dual-wheeled oscillating carriages with the coaxial trunnion drive are both rugged and dependable units for replacing the larger wheels in earthmoving equipment. Their construction is extremely simple and service is easy which makes them both economical and desirable in applications where they can be employed. Obviously, by including the drive unit within the carriage, no transmission or power to the carriage by an axle or shaft is necessary, but the present invention is restricted to oscillating carriages wherein the drive torque is provided external to the carriage and not those types of systems where electrical motors and the like are included within the carriage proper.

Normally, when employing the carriages of the type described, external stops will be provided on the support structure in order to limit the travel of the carriage, since overtravel of the carriage will cause the tires 27 to rub on support structures and damage them.

These novel wheel carriages are flexible units and can be incorporated with conventional differential means located ahead or behind the wheel carriages on opposite sides of the vehicle. Actually in FIG. 1 a differential cross tube 16 is shown forward of the carriages which interconnects the carriages in a common differential drive through rearwardly extending right angle tubes (not shown). It can be powered with electrical, hydrostatic or mechanical means. Obviously an arrangement could be selected with the differential tube connected between tandemly connected units and which extends across the vehicle to a similar connection with tandem units on the opposite side.

Having described my invention, I claim:

1. A multi-wheeled oscillating carriage having high load capacity in combination with supporting structures of a powered vehicle comprising:
   a hollow gear case having axially aligned trunnion mounts on opposite ends thereof;
   two wheel support means mounted on opposite sides of said gear case and projecting therefrom to form a rigid axle which has its axis transverse to the axis of said trunnion mounts;
   wheels journaled on opposite sides of said rigid axle for rotation which tilt about the axis of the trunnion mounts when said carriage oscillates due to ground engagement of its wheels;
   at least one shaft means coaxially mounted in one of said trunnion mounts capable of delivering or recovering torque from within said gear case;
   gear means located in said gear case and connected with said shaft means;
   floating shaft means connecting said gear means with said wheels for interchange of torque therebetween; and said gear means includes a driven beveled gear having a sun gear integrally formed on its hub and a planetary gear system cooperating therewith to effect a gear reduction; said planetary system including planetary gears, a planet carrier and a fixed ring gear.

2. The multi-wheeled oscillating carriage as defined in claim 1 wherein at least one of the wheels includes a key mounting means for elements of a disc brake and its adjacent wheel support means includes a disc brake assembly.

3. The multi-wheeled structure as defined in claim 1 wherein said planet gears track around said fixed ring gear and said planet carrier drives said floating shaft means.

References Cited
UNITED STATES PATENTS

| | | | |
|---|---|---|---|
| 3,029,889 | 4/1962 | Paramythioti | 180—42 |
| 3,161,250 | 12/1964 | Gardner | 180—22 |

FOREIGN PATENTS

| | | |
|---|---|---|
| 681,325 | 10/1952 | Great Britain. |

A. HARRY LEVY, *Primary Examiner.*